US009009389B2

(12) United States Patent
Teo et al.

(10) Patent No.: US 9,009,389 B2
(45) Date of Patent: Apr. 14, 2015

(54) MEMORY MANAGEMENT TABLE PROCESSING METHOD, MEMORY CONTROLLER, AND MEMORY STORAGE APPARATUS

(75) Inventors: Wei-Chen Teo, Miaoli County (TW); Ming-Jen Liang, Hsinchu (TW); Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 890 days.

(21) Appl. No.: 13/214,223

(22) Filed: Aug. 21, 2011

(65) Prior Publication Data

US 2012/0324205 A1    Dec. 20, 2012

(30) Foreign Application Priority Data

Jun. 14, 2011   (TW) .............................. 100120727 A

(51) Int. Cl.
*G06F 12/00*    (2006.01)
*G06F 12/02*    (2006.01)

(52) U.S. Cl.
CPC .... *G06F 12/0246* (2013.01); *G06F 2212/7203* (2013.01); *G06F 2212/7201* (2013.01)

(58) Field of Classification Search
CPC ................................................ G06F 2212/7203
USPC .................................................... 711/212, 103
See application file for complete search history.

(56) References Cited

U.S. PATENT DOCUMENTS

2009/0172257 A1*   7/2009   Prins et al. .................... 711/103

FOREIGN PATENT DOCUMENTS

TW    200941487    10/2009
TW    201115335    5/2011

\* cited by examiner

*Primary Examiner* — Kalpit Parikh
(74) *Attorney, Agent, or Firm* — Jianq Chyun IP Office

(57) ABSTRACT

A memory management table processing method for storing a plurality of entries belonging to a plurality of memory management tables into a buffer memory of a memory storage apparatus is provided, wherein each of the entries has at least one invalid bit. The present method includes following steps. An area corresponding to each of the memory management tables is configured in the buffer memory. Invalid bit information corresponding to each of the memory management tables is recorded. The invalid bit in each of the entries is removed according to the invalid bit information corresponding to each of the memory management tables, so as to generate a valid data stream corresponding to each of the entries. Each of the valid data streams is written into the corresponding area in the buffer memory. Accordingly, the storage space of the buffer memory can be efficiently utilized.

19 Claims, 10 Drawing Sheets

MEMORY MANAGEMENT TABLE PROCESSING METHOD, MEMORY CONTROLLER, AND MEMORY STORAGE APPARATUS

CROSS-REFERENCE TO RELATED APPLICATION

This application claims the priority benefit of Taiwan application serial no. 100120727, filed on Jun. 14, 2011. The entirety of the above-mentioned patent application is hereby incorporated by reference herein and made a part of specification.

BACKGROUND

1. Technology Field

The present invention generally relates to a memory management table processing method, and more particularly, to a memory management table processing method for writing data streams belonging to a memory management table into a buffer memory and reading data streams belonging to the memory management table from the buffer memory, and a memory controller and a memory storage apparatus using the same.

2. Description of Related Art

Along with the widespread of digital cameras, cell phones, and MP3 in recently years, the consumers' demand to storage media has increased drastically. Rewritable non-volatile memory is one of the most adaptable storage media to portable electronic products (for example, cell phones, personal digital assistants (PDAs), and notebook computers) due to its many characteristics such as data non-volatility, low power consumption, small volume, non-mechanical structure, and high access speed. For example, a solid state drive (SSD) is a storage apparatus which uses a flash memory as its storage medium. Thus, in recent years, the flash memory industry has become a major part of the electronic industry.

A rewritable non-volatile memory module has a plurality of physical blocks, and each of the physical blocks has a plurality of physical pages. While writing data into a physical block, the data has to be written according to the sequence of the physical pages. In addition, a physical page containing data has to be erased before it is used for writing new data. In particular, each physical block is the smallest erasing unit, and each physical page is the smallest programming (i.e., writing) unit.

In order to improve the operation efficiency, a memory controller of a flash memory storage apparatus groups the physical blocks of a flash memory module into a data area, a free area, a system area, and a replacement area.

Physical blocks in the data area are used for storing data written by a host system. To be specific, a memory controller converts a logical access address accessed by the host system into a logical page of a logical block and maps the logical page of the logical block to a physical page of a physical block in the data area. Namely, in the management of a flash memory module, the physical blocks in the data area are considered used physical blocks (for example, already containing data written by a host system). Additionally, the memory controller records the mapping relationship between the logical blocks and the physical blocks in the data area in a logical block-physical block mapping table, wherein the logical pages of each logical block are sequentially mapped to the physical pages of the corresponding physical block.

Physical blocks in the free area are used for substituting the physical blocks in the data area. To be specific, a physical block already containing data has to be erased before it is used for writing new data, while a physical block in the free area is used for writing updated data and substituting the physical block originally mapped to a logical block. Accordingly, the physical blocks in the free area are either blank blocks or usable blocks (i.e., no data is recorded therein or data recorded therein is already marked as invalid data).

Physical blocks in the system area are used for recording system data, such as the manufacturer and model of the flash memory module, the number of physical blocks in the flash memory module, and the number of physical pages in each physical block.

Physical blocks in the replacement area are used for replacing damaged physical blocks. To be specific, if there are still normal physical blocks in the replacement area and a physical block in the data area is damaged, the memory management circuit selects a normal physical block from the replacement area to replace the damaged physical block.

In order to deal with complicated management operations while managing the flash memory module, the memory controller usually uses many memory management tables for recording information related to the physical blocks. In particular, during the operation of the flash memory storage apparatus, the memory management tables are temporarily stored in a buffer memory to be updated. These memory management tables may include a logical block-physical block mapping table, a free area physical block table, a replacement area physical block table, a system area physical block table, a bad block table, and an erasing count table, etc. Along with the increase in the complicacy of management logic, the number of memory management tables to be used by the memory controller also increases and accordingly more and more storage space in the buffer memory will be taken. However, since the buffer memory offers only a limited storage space, how to efficiently utilize the storage space of the buffer memory has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a memory management table processing method, a memory controller, and a memory storage apparatus, in which the storage space of a buffer memory can be efficiently utilized.

According to an exemplary embodiment of the present invention, a memory management table processing method for storing a plurality of entries belonging to a plurality of memory management tables into a buffer memory of a memory storage apparatus is provided, wherein each of the entries of the memory management tables has at least one invalid bit. The memory management table processing method includes configuring a plurality of areas in the buffer memory for storing the memory management tables, wherein each of the areas is corresponding to one of the memory management tables. The memory management table processing method also includes recording invalid bit information corresponding to each of the memory management tables, wherein the invalid bit information includes information of the invalid bit of each of the entries of the memory management tables. The memory management table processing method further includes removing at least one invalid bit data from each of the entries according to the invalid bit information to generate a plurality of valid data streams corresponding to the entries of the memory management tables. The memory management table processing method still includes writing each of the valid data streams into a corresponding one of the areas in the buffer memory.

According to an exemplary embodiment of the present invention, a memory controller for managing a rewritable non-volatile memory module is provided. The memory controller includes a memory management circuit, a host interface, a memory interface, a buffer memory, and a temporary data processing circuit. The host interface is configured to couple to a host system. The memory interface is coupled to the rewritable non-volatile memory module. The memory management circuit is coupled to the host interface and the memory interface. The buffer memory is configured to temporarily store data. The temporary data processing circuit is coupled to the memory management circuit and configured to store a plurality of entries belonging to a plurality of memory management tables into a buffer memory of a memory storage apparatus, wherein each of the entries of the memory management tables has at least one invalid bit. The temporary data processing circuit configures a plurality of areas in the buffer memory for storing the memory management tables, wherein each of the areas is corresponding to one of the memory management tables. Besides, the temporary data processing circuit records invalid bit information corresponding to each of the memory management tables, wherein the invalid bit information includes information of the invalid bit of each of the entries of the memory management tables. In addition, the temporary data processing circuit removes at least one invalid bit data from each of the entries according to the invalid bit information to generate a plurality of valid data streams corresponding to the entries of the memory management tables, and the temporary data processing circuit writes each of the valid data streams into a corresponding one of the areas in the buffer memory.

The invention provides a memory storage apparatus including a connector, a rewritable non-volatile memory module, and a memory controller. The connector is configured to couple to a host system. The rewritable non-volatile memory module is configured to store data. The memory controller is coupled to the connector and the rewritable non-volatile memory module and includes a memory management circuit, a host interface, a memory interface, a buffer memory, and a temporary data processing circuit. The host interface is coupled to the host system. The memory interface is coupled to the rewritable non-volatile memory module. The memory management circuit is coupled to the host interface and the memory interface. The buffer memory is configured to temporarily store data. The temporary data processing circuit is coupled to the memory management circuit and configured to store a plurality of entries belonging to a plurality of memory management tables into a buffer memory of the memory storage apparatus, wherein each of the entries of the memory management tables has at least one invalid bit. The temporary data processing circuit configures a plurality of areas in the buffer memory for storing the memory management tables, wherein each of the areas is corresponding to one of the memory management tables. Besides, the temporary data processing circuit records invalid bit information corresponding to each of the memory management tables, wherein the invalid bit information includes information of the invalid bit of each of the entries of the memory management tables. In addition, the temporary data processing circuit removes at least one invalid bit data from each of the entries according to the invalid bit information to generate a plurality of valid data streams corresponding to the entries of the memory management tables, and the temporary data processing circuit writes each of the valid data streams into a corresponding one of the areas in the buffer memory.

As described above, in the memory management table processing method, the memory controller, and the memory storage apparatus provided by the present invention, invalid bit data is removed from data streams corresponding to entries belonging to memory management tables before the data streams are written into the buffer memory, and the removed invalid bit data is restored after the data streams are read from the buffer memory. Thereby, the storage space of the buffer memory can be efficiently utilized.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
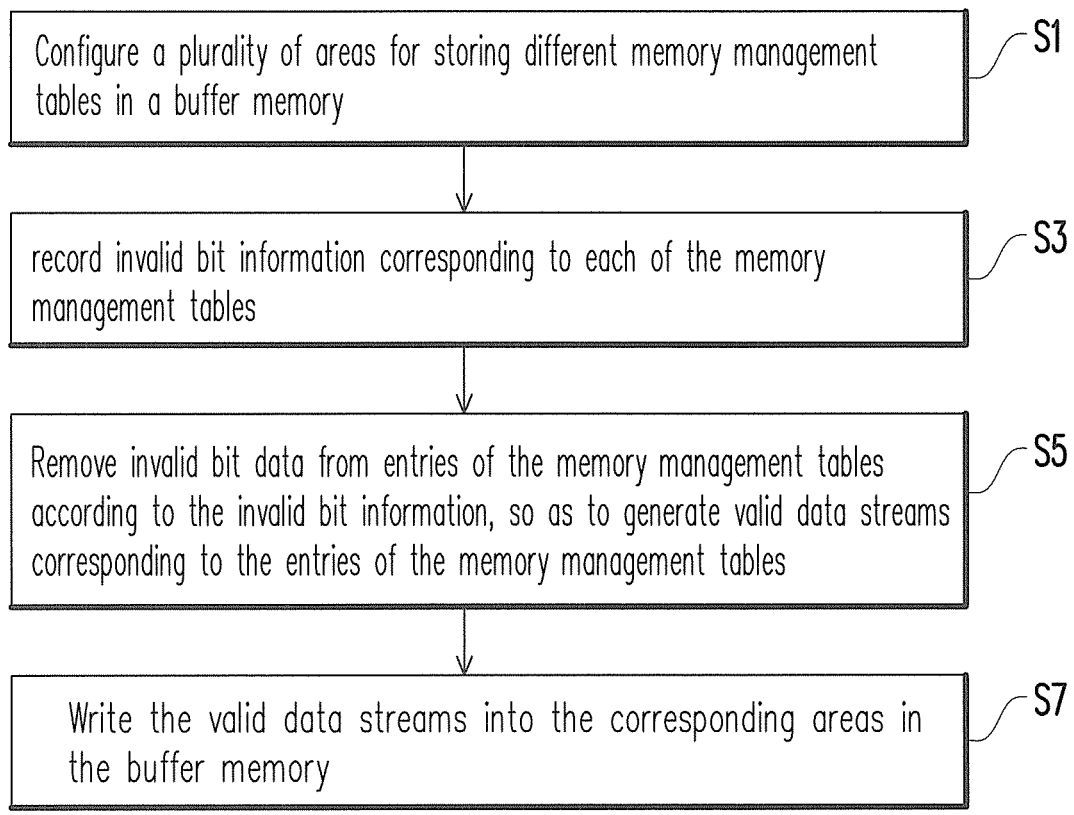
FIG. 1 is a flowchart of a memory management table processing method according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In order to improve the use efficiency of a buffer memory, the present invention provides a data processing method in which the storage space required for storing memory management tables is effectively reduced. As shown in FIG. 1, in the memory management table processing method, a plurality of areas for storing different memory management tables is configured in a buffer memory (S1), wherein each of the areas is corresponding to one of the memory management tables. In addition, in the memory management table processing method, invalid bit information corresponding to each of the memory management tables is recorded (S3), wherein the invalid bit information includes information of at least one invalid bit of each entry of the memory management tables. More, in the memory management table processing method, invalid bit data is removed from the entries of the memory management tables according to the invalid bit information, so as to generate valid data streams corresponding to the entries of the memory management tables (S5), and the valid data streams are respectively written into the corresponding areas in the buffer memory (S7). The present invention will be described in detail with reference to several exemplary embodiments and accompanying drawings.

Generally, a memory storage apparatus (also referred to as a memory storage system) includes a rewritable non-volatile memory module and a controller (also referred to as a control circuit). The memory storage apparatus is usually used with a host system so that the host system can write data into or read data from the memory storage apparatus.

Figure 2A:
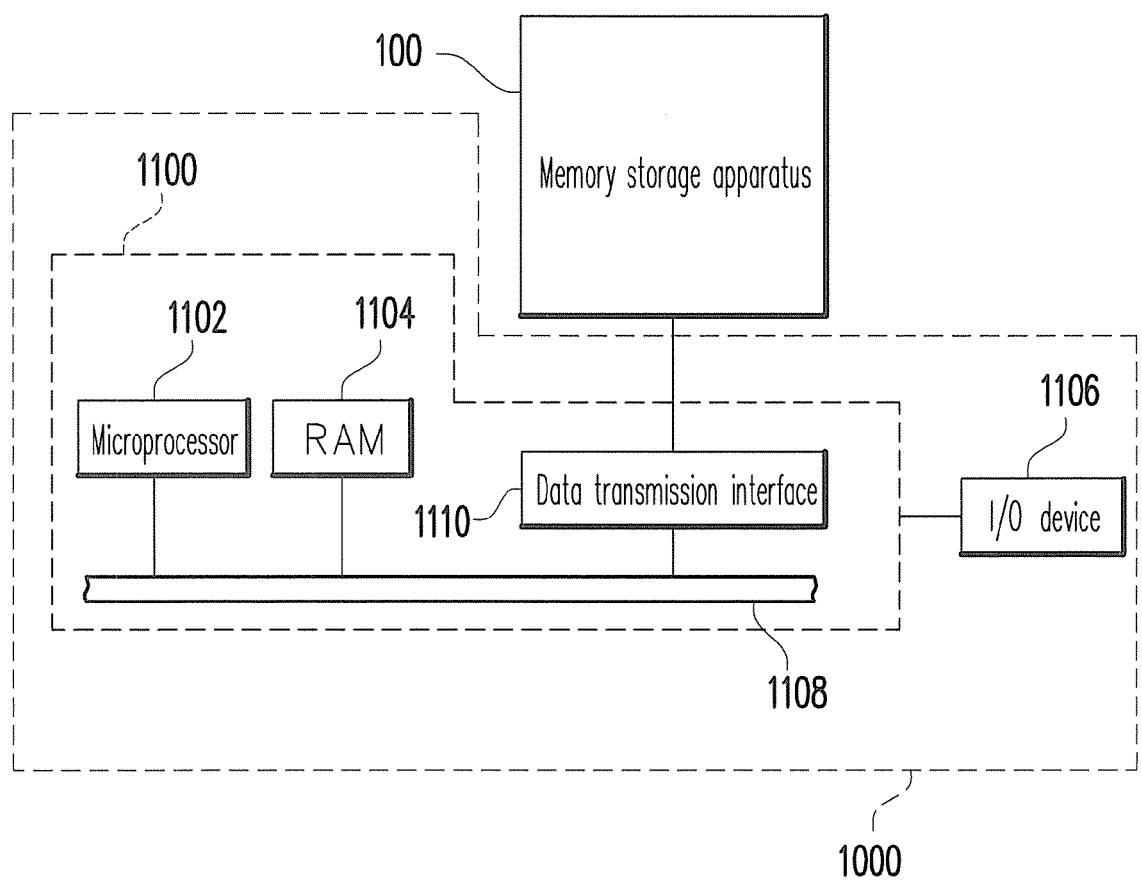
FIG. 2A illustrates a host system and a memory storage apparatus according to an exemplary embodiment of the present invention.

FIG. 2A illustrates a host system and a memory storage apparatus according to an exemplary embodiment of the present invention.

Figure 2B:
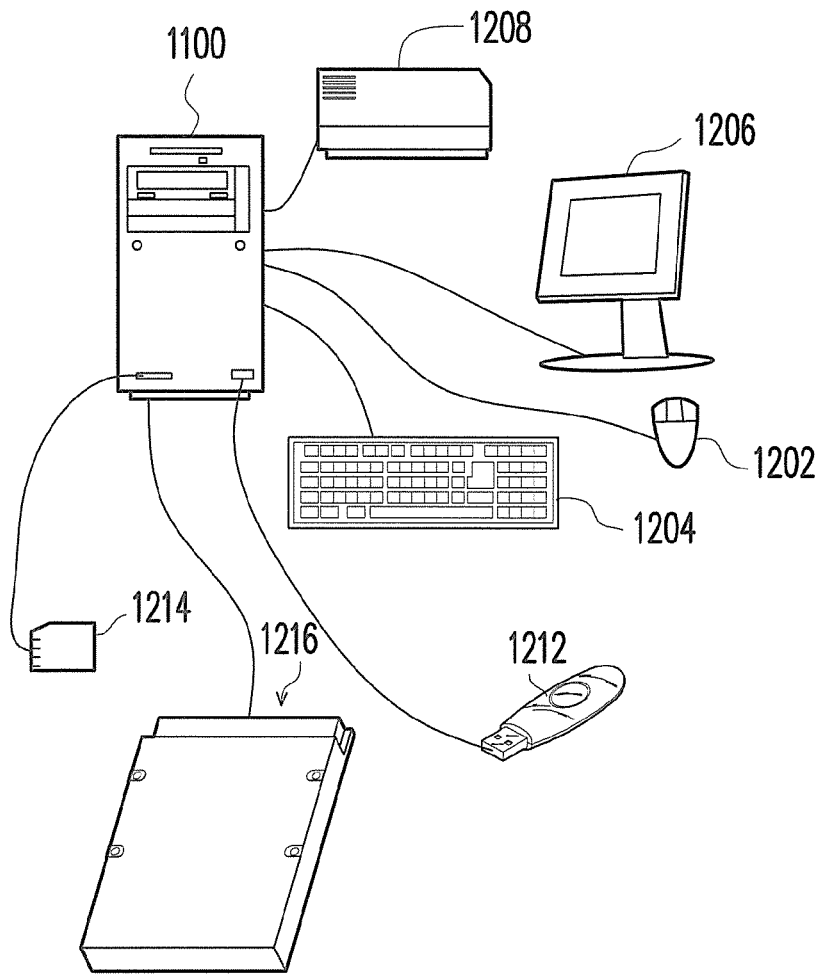
FIG. 2B is a diagram of a computer, an input/output (I/O) device, and a memory storage apparatus according to an exemplary embodiment of the present invention.

Referring to FIG. 2A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2B. However, the I/O device 1106 is not limited to the devices illustrated in FIG. 2B and may further include other devices.

In the present embodiment, a memory storage apparatus 100 is coupled to other components of the host system 1000 through the data transmission interface 1110. Data can be written into or read from the memory storage apparatus 100 through the operations of the microprocessor 1102, the RAM 1104, and the I/O device 1106. The memory storage apparatus 100 is a rewritable non-volatile memory storage apparatus, such as the flash drive 1212, the memory card 1214, or the solid state drive (SSD) 1216 illustrated in FIG. 2B.

Figure 2C:
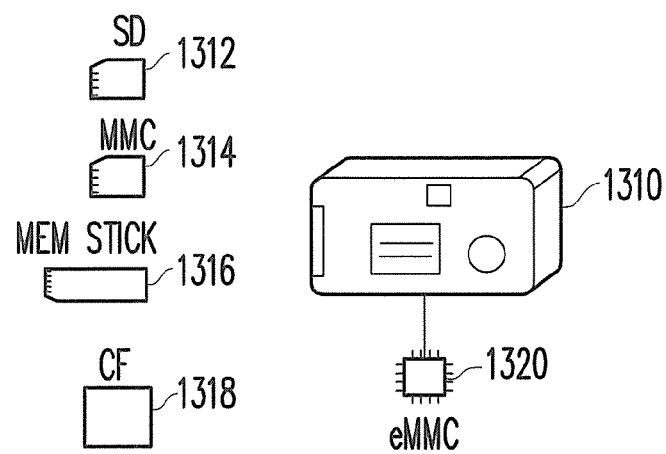
FIG. 2C is a diagram of a host system and a memory storage apparatus according to an exemplary embodiment of the present invention.

Generally, the host system 1000 can be substantially any system that works with the memory storage apparatus 100 to store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage apparatus is then a secure digital (SD) card 1312, a multimedia card (MMC) card 1314, a memory stick (MS) 1316, a compact flash (CF) card 1318, or an embedded storage device 1320 (as shown in FIG. 2C) used by the digital camera (video camera) 1310. The embedded storage device 1320 includes an embedded MMC (eMMC). It should be mentioned that the eMMC is directly coupled to the motherboard of a host system.

Figure 3:
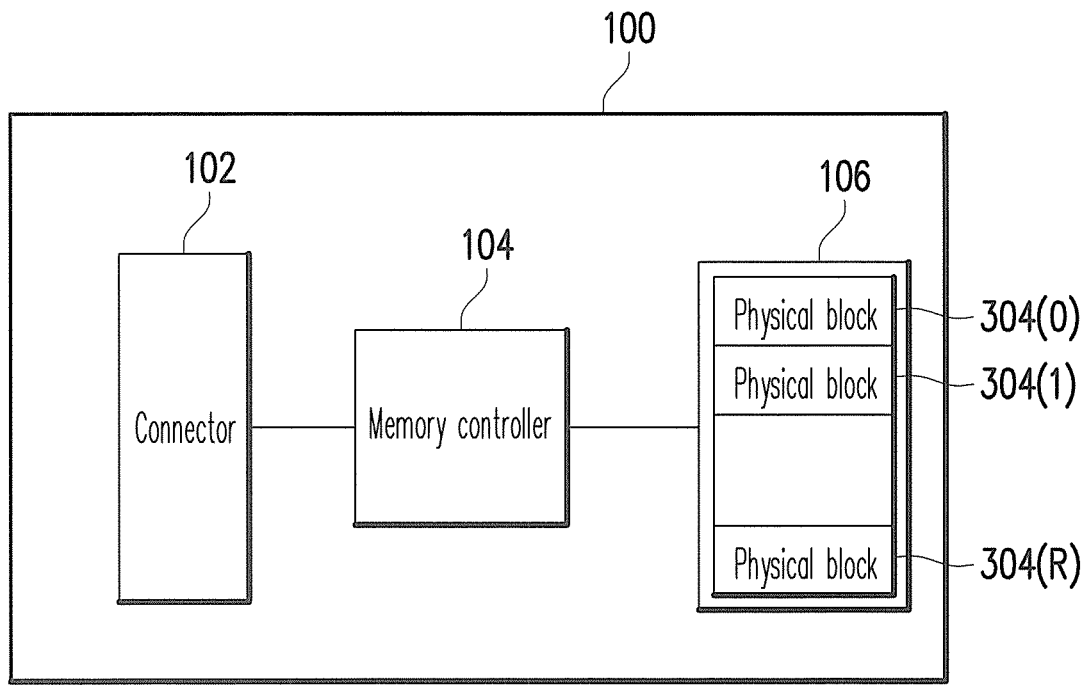
FIG. 3 is a schematic block diagram of a memory storage apparatus according to an exemplary embodiment of the present invention.

FIG. 3 is a schematic block diagram of a memory storage apparatus according to an exemplary embodiment of the present invention.

Referring to FIG. 3, the memory storage apparatus 100 includes a connector 102, a memory controller 104, and a rewritable non-volatile memory module 106.

In the present exemplary embodiment, the connector 102 complies with the serial advanced technology attachment (SATA) standard. However, the invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the SD interface standard, the MS interface standard, the MMC interface standard, the CF interface standard, the integrated device electronics (IDE) standard or any other suitable standard.

The memory controller 104 executes a plurality of logic gates or control instructions implemented in a hardware form or a firmware form and performs various data operations on the rewritable non-volatile memory module 106 according to commands issued by the host system 1000.

The rewritable non-volatile memory module 106 is coupled to the memory controller 104 and has a plurality of physical blocks for storing data written by the host system 1000. In the present exemplary embodiment, each of the physical blocks has a plurality of physical pages, wherein the physical pages belonging to the same physical block can be individually written but have to be erased all together. Each physical block may be composed of 128 physical pages. However, the invention is not limited thereto, and each physical block may also be composed of 64, 256, or any other number of physical pages.

To be specific, each of the physical blocks is the smallest unit for erasing data. Namely, each of the physical blocks contains the least number of memory cells that are erased all together. Each of physical pages is the smallest unit for programming data. Namely, each of the physical pages is the smallest unit for reading and writing data. However, in another exemplary embodiment, the smallest unit for writing data may also be sector or any other unit. Each physical page usually includes a data bit area and a redundant bit area. The data bit area is used for storing user data, and the redundant bit area is used for storing system data (for example, error checking and correcting (ECC) codes).

In the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, any other flash memory module, or any other memory module having the same characteristics.

Figure 4:
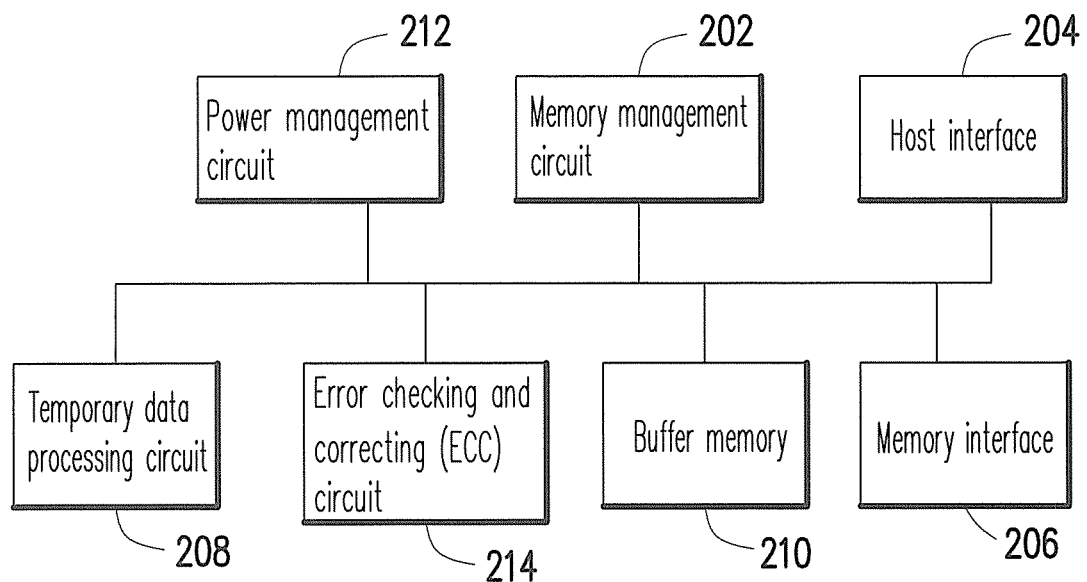
FIG. 4 is a schematic block diagram of a memory controller according to an exemplary embodiment of the present invention.

FIG. 4 is a schematic block diagram of a memory controller according to an exemplary embodiment of the present invention.

Referring to FIG. 4, the memory controller 104 includes a memory management circuit 202, a host interface 204, a memory interface 206, a temporary data processing circuit 208, and a buffer memory 210.

The memory management circuit 202 controls the overall operation of the memory controller 104. To be specific, the memory management circuit 202 has a plurality of control instructions, and when the memory storage apparatus 100 is in operation, the control instructions are executed to perform various data operations, such as a writing operation, an erasing operation, a reading operation and so on.

In the present exemplary embodiment, the control instructions of the memory management circuit 202 are implemented in a firmware form. For example, the memory management circuit 202 has a microprocessor unit (not shown) and a read-only memory (ROM, not shown), and the control instructions are burnt into the ROM. When the memory storage apparatus 100 is in operation, the control instructions are executed by the microprocessor unit.

In another exemplary embodiment of the invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). In particular, the ROM has a driving code, and when the memory controller 104 is enabled, the microprocessor unit first executes the driving code to load these control instructions from the rewritable non-volatile memory module 106 into the RAM of the memory management circuit 202, and then executes these control instructions. Moreover, in yet another exemplary embodiment of the present invention, the control instructions of the memory management circuit 202 may also be implemented in a hardware form.

The host interface 204 is coupled to the connector 102 and the memory management circuit 202 and configured to receive and identify commands and data from the host system 1000. Namely, commands and data transmitted by the host system 1000 are transmitted to the memory management circuit 202 through the host interface 204. In the present exemplary embodiment, the host interface 204 complies with the SATA standard. However, the invention is not limited thereto, and the host interface 204 may also comply with the PATA standard, the IEEE 1394 standard, the PCI express standard, the USB standard, the SD standard, the MS standard, the MMC standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

The temporary data processing circuit 208 is coupled to the buffer memory 210 and the memory management circuit 202. The temporary data processing circuit 208 stores data to be temporarily stored by the memory management circuit 202 into the buffer memory 210 and reads data to be read by the memory management circuit 202 from the buffer memory 210.

The buffer memory 210 is coupled to the memory management circuit 202 and configured to temporarily store data and commands from the host system 1000 or data from the rewritable non-volatile memory module 106. In particular, the temporary data processing circuit 208 temporarily stores memory management tables (for example, a logical block-physical block mapping table) used for managing the rewritable non-volatile memory module 106 into the buffer memory 210.

In addition, in the present exemplary embodiment, the memory controller 104 may further includes a power management circuit 212 and an error checking and correcting (ECC) circuit 214. The power management circuit 212 is coupled to the memory management circuit 202 and configured to manage the power supply of the memory storage apparatus 100.

The ECC circuit 214 is coupled to the memory management circuit 202 and configured to execute an ECC procedure to ensure data accuracy. To be specific, when the memory management circuit 202 receives a write command from the host system 1000, the ECC circuit 214 generates a corresponding ECC code for the data corresponding to the write command, and the memory management circuit 202 writes both the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 214 executes the ECC procedure on the data according to the ECC code.

Figure 5:
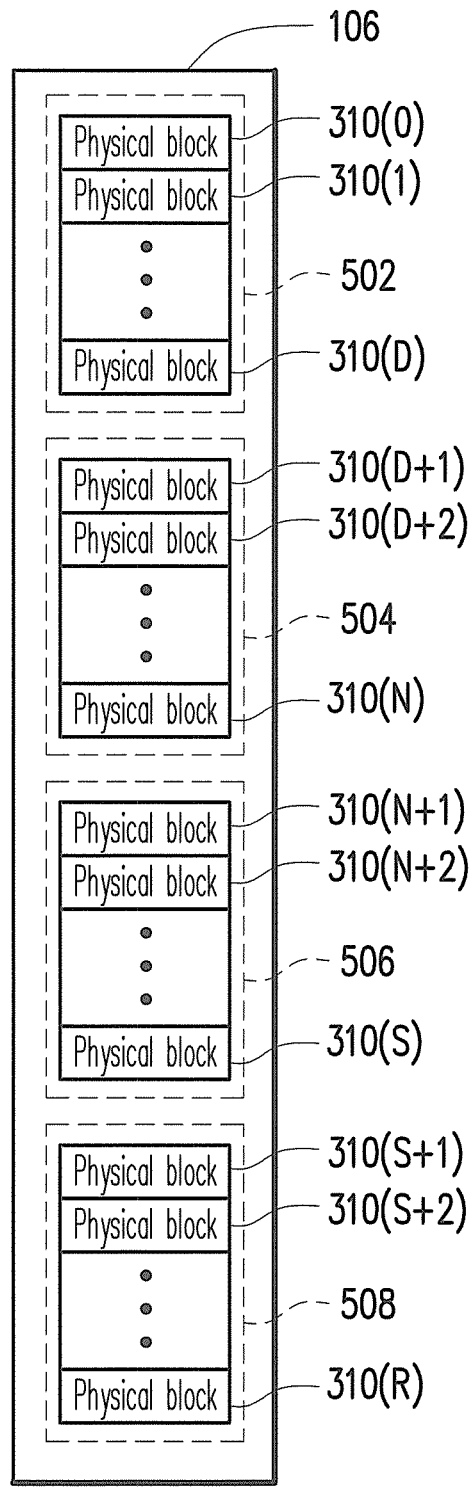
FIG. 5 and FIG. 6 are diagrams of managing physical blocks of a rewritable non-volatile memory module according to an exemplary embodiment of the present invention.
Figure 6:
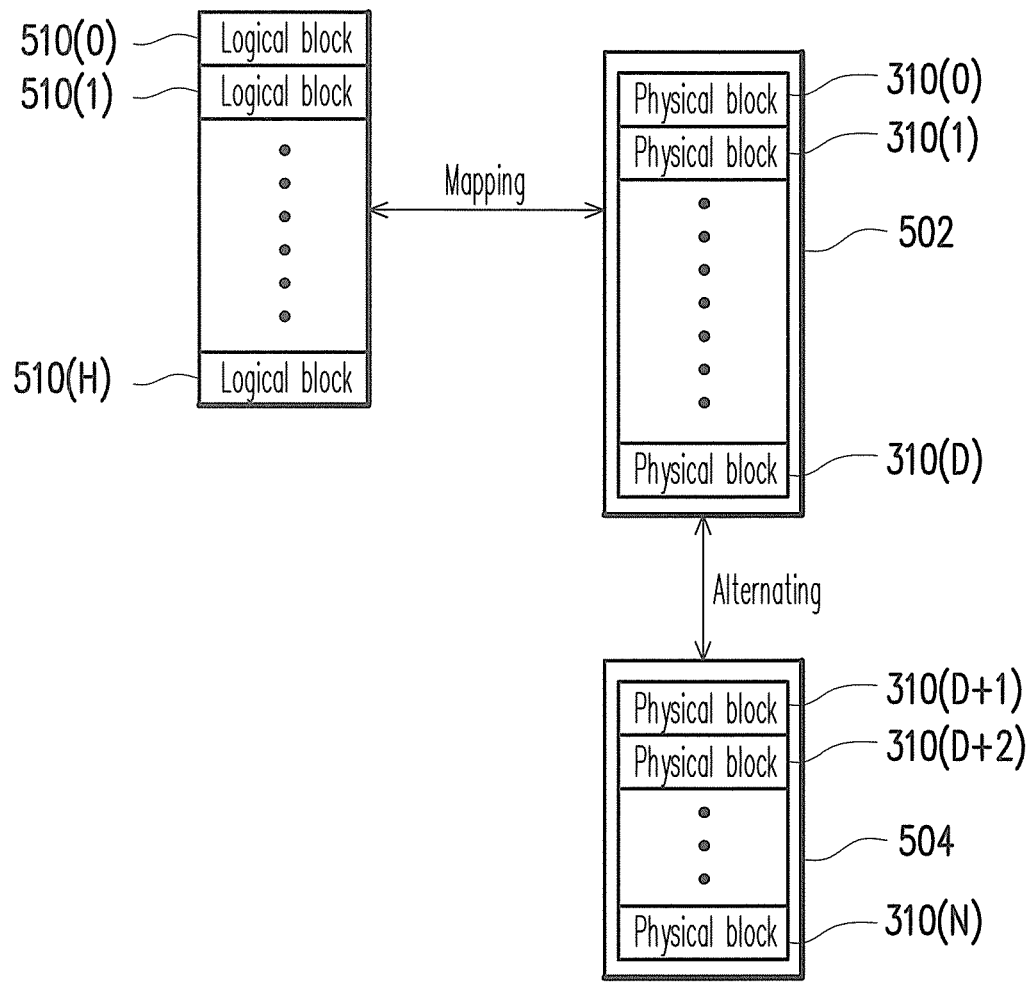

FIG. 5 and FIG. 6 are diagrams of managing physical blocks of a rewritable non-volatile memory module according to an exemplary embodiment of the present invention.

Referring to FIG. 5, the rewritable non-volatile memory module 106 has physical blocks 310(0)-310(R), and the memory management circuit 202 of the memory controller 104 logically groups the physical blocks 310(0)-310-(R) into a data area 502, a free area 504, a system area 506, and a replacement area 508.

Physical blocks logically belonging to the data area 502 and the free area 504 are used for storing data from the host system 1000. To be specific, the physical blocks in the data area 502 are considered physical blocks already containing data, and the physical blocks in the free area 504 are used for substituting the physical blocks in the data area 502. Namely, when a write command and new data, which is used to update old data stored in a physical block of the data area 502, are received from the host system 1000, the memory management circuit 202 selects a physical block from the free area 504 and writes the new data into the selected physical block to substitute the physical block of the data area 502.

Physical blocks logically belonging to the system area 506 are used for recording system data, such as the manufacturer and model of the rewritable non-volatile memory module, the number of physical blocks in the rewritable non-volatile memory module, and the number of physical pages in each physical block.

Physical blocks logically belonging to the replacement area 508 are used for replacing damaged physical blocks. To be specific, if there are still normal physical blocks in the replacement area 508 and a physical block in the data area 502 is damaged, the memory management circuit 202 selects a normal physical block from the replacement area 508 to replace the damaged physical block.

It should be mentioned that in the present exemplary embodiment, the memory management circuit 202 manages the rewritable non-volatile memory module 106 in units of each physical block. However, the present invention is not limited thereto, and in another exemplary embodiment, the memory management circuit 202 may also group the physical blocks into a plurality of physical units and manages the rewritable non-volatile memory module 106 in units of each physical unit. Each physical unit may be composed of a plurality of physical blocks in a single sub memory module or different sub memory modules.

Particularly, the numbers of physical blocks in the data area 502, the free area 504, the system area 506, and the replacement area 508 vary with different memory specifications. In addition, it should be understood that during the operation of the memory storage apparatus 100, the physical blocks associated with the data area 502, the free area 504, the system area 506, and the replacement area 508 are dynamically changed. For example, when a physical block in the free area 504 is damaged and accordingly replaced by a physical block in the replacement area 508, the physical block originally in the replacement area 508 is associated with the free area 504.

Referring to FIG. 6, as described above, the physical blocks in the data area 502 and the free area 504 are alternatively used for storing data written by the host system 1000. In the present exemplary embodiment, the memory management circuit 202 configures logical blocks 510(0)-510(H) for mapping to foregoing physical blocks that are alternatively used for storing data, and the memory management circuit 202 maps logical pages in the logical blocks 510(0)-510(H) to logical access addresses accessed by the host system 1000 to allow the host system 1000 to access data.

For example, the memory management circuit 202 initially maps the logical blocks 510(0)-510(H) to the physical blocks in the data area 502. To be specific, after the memory storage apparatus 100 is manufactured, the logical blocks 510(0)-510(H) are respectively mapped to the physical blocks 310(0)-310(D) in the data area 502. Namely, one logical block is mapped to one physical block in the data area 502. The memory management circuit 202 establishes a logical block-physical block mapping table to record the mapping relationship between the logical blocks and the physical blocks. Namely, the memory management circuit 202 converts a logical access address to be accessed by the host system 1000 into logical pages of the corresponding logical block and accesses data in the corresponding physical block based on the logical block-physical block mapping table.

As described above, when the memory management circuit 202 of the memory controller 104 manages the rewritable non-volatile memory module 106, it uses many memory management tables, such as the logical block-physical block mapping table recording the mapping relationship between the logical blocks 510(0)-510(H) and the physical blocks in the data area 502, a free area physical block table recording the physical blocks in the free area 504, a replacement area physical block table recording the physical blocks in the replacement area 508, a system area physical block table recording the physical blocks in the system area 506, a bad block table recording damaged physical blocks, and an erasing count table recording the number of times each physical block is erased.

Generally, before the memory storage apparatus 100 is turned off, the memory management circuit 202 stores the latest memory management tables back into the rewritable non-volatile memory module 106. Besides, when the memory storage apparatus 100 is in operation, the memory management circuit 202 loads the memory management tables from the rewritable non-volatile memory module 106, and the temporary data processing circuit 208 temporarily stores these memory management tables into the buffer memory 210 so that these memory management tables can be instantly updated.

It should be noted that each memory management table is composed of a plurality of entries, and each of the entries includes a plurality of bits. To be specific, a microprocessor unit of the memory management circuit 202 temporarily stores data into the buffer memory 210 and reads data from the buffer memory 210 in fixed unit. For example, data is accessed in unit of byte (i.e., 8 bits). Thus, each entry is design to have a fixed size. However, because different memory management tables may have different sizes, the memory management circuit 202 uses only some of the bits in each entry for storing valid data and fills up the other bits with invalid bit data (for example, '0'). Herein the bits in each entry that are not used for storing valid data are referred to as invalid bits. Thus, in the present exemplary embodiment, each entry contains at least one invalid bit and all the entries have the same data pattern in one memory management table. Namely, specific bits in each entry of a memory management table are invalid bits.

Figure 7:
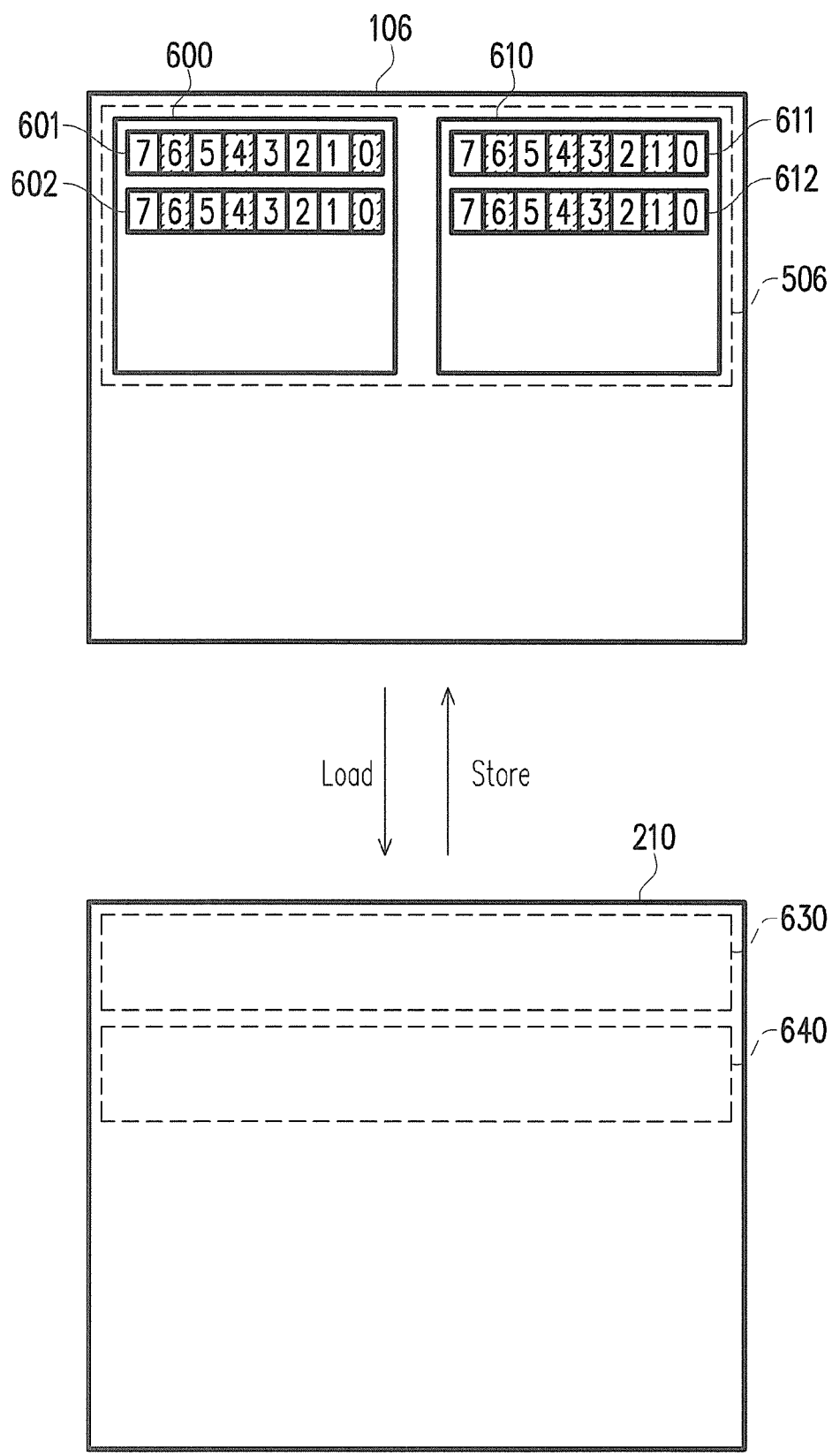
FIG. 7 is a diagram illustrating memory management tables and corresponding areas in a buffer memory according to an exemplary embodiment of the present invention.

FIG. 7 is a diagram illustrating memory management tables and corresponding areas in a buffer memory according to an exemplary embodiment of the present invention.

Referring to FIG. 7, herein it is assumed that the memory management circuit 202 manages the rewritable non-volatile memory module 106 by using a first memory management table 600 (for example, a logical block-physical block mapping table) and a second memory management table 610 (for example, a bad block table), and the first memory management table 600 and the second memory management table 610 are stored in the system area 506 of the rewritable non-volatile memory module 106. However, in another exemplary embodiment of the present invention, the first memory management table 600 and the second memory management table 610 may also be stored in the data area 502 of the rewritable non-volatile memory module 106. Additionally, even though two memory management tables are described in the present exemplary embodiment, the number of memory management tables is not limited in the present invention.

The first memory management table 600 and the second memory management table 610 respectively include a plurality of entries, and each of the entries is composed of a plurality of bits. The memory management circuit 202 records data on each bit. For example, the first memory management table 600 includes an entry 601 and an entry 602, and the second memory management table 610 includes an entry 611 and an entry 612. In particular, all the entries in the first memory management table 600 have the same number of bits and contain invalid bits at same positions. For example, both the entry 601 and the entry 602 have 8 bits, and the $0^{th}$, $4^{th}$ and $6^{th}$ bits thereof are invalid bits (as indicated in FIG. 7 with diagonal lines). Both the entry 611 and the entry 612 have 8 bits, and the $1^{st}$, $3^{rd}$, $4^{th}$, and $6^{th}$ bits thereof are invalid bits (as indicated in FIG. 7 with diagonal lines). Even though each memory management table includes two entries in the present exemplary embodiment, the present invention is not limited thereto, and in another exemplary embodiment of the present invention, each memory management table may include more entries. Moreover, even though each entry has 8 bits (i.e., one byte) in the present exemplary embodiment, the size of each entry is not limited in the present invention. For example, an entry may also have two bytes, four bytes, or some other sizes.

In the present exemplary embodiment, the temporary data processing circuit 208 configures a first area 630 and a second area 640 respectively corresponding to the first memory management table 600 and the second memory management table 610 in the buffer memory 210. In other words, the temporary data processing circuit 208 divides a portion of the buffer memory 210 into the first area 630 for the first memory management table 600 and the second area 640 for second memory management table 610. And, the temporary data processing circuit 208 respectively records invalid bit information corresponding to the first memory management table 600 and invalid bit information corresponding to the second memory management table 610, wherein the invalid bit information records the invalid bits in each entry of a memory management table.

In particular, when the memory management circuit 202 is about to load the first memory management table 600 into the buffer memory 210, the temporary data processing circuit 208 writes the entries belonging to the first memory management table 600 into the first area 630 of the buffer memory 210. Similarly, when the memory management circuit 202 is about to load the second memory management table 610 into the buffer memory 210, the temporary data processing circuit 208 writes the entries belonging to the second memory management table 610 into the second area 640 of the buffer memory 210. Namely, the first area 630 is used for storing only entries belonging to the first memory management table 600, while the second area 640 is used for storing only entries belonging to the second memory management table 610. It should be mentioned that in the present exemplary embodiment, two areas are configured in the buffer memory 210 for respectively storing the memory management tables. However, the present invention is not limited thereto, and in another exemplary embodiment of the present invention, more areas are configured when the number of memory management tables increases, or if there is only one memory management table, only one area is configured for storing the memory management table.

It should be mentioned that while writing the entries belonging to a memory management table into a buffer memory, it is a waste of the limited storage space of the buffer memory 210 if the invalid bits are written into the buffer memory. In the present exemplary embodiment, the temporary data processing circuit 208 first removes invalid bit data from each entry and then stores the entries without the invalid bit data (referred to as valid data streams thereinafter) into the buffer memory 210, so as to avoid waste of the storage space of the buffer memory.

To be specific, the temporary data processing circuit 208 identifies the memory management table corresponding to a data stream to be temporarily stored into the buffer memory 210 and removes invalid bit data from the data stream according to the invalid bit information corresponding to the memory management table. After that, the temporary data processing circuit 208 writes the valid data stream without the invalid bit data into the buffer memory 210.

Contrarily, while reading data from the buffer memory 210, the temporary data processing circuit 208 first identifies the memory management table corresponding to a data stream and then restores the data stream into an original entry (by adding the invalid bit data back into the data stream) according to the invalid bit information corresponding to the memory management table. Thereafter, the temporary data processing circuit 208 sends the restored entry to the memory management circuit 202.

Figure 8:
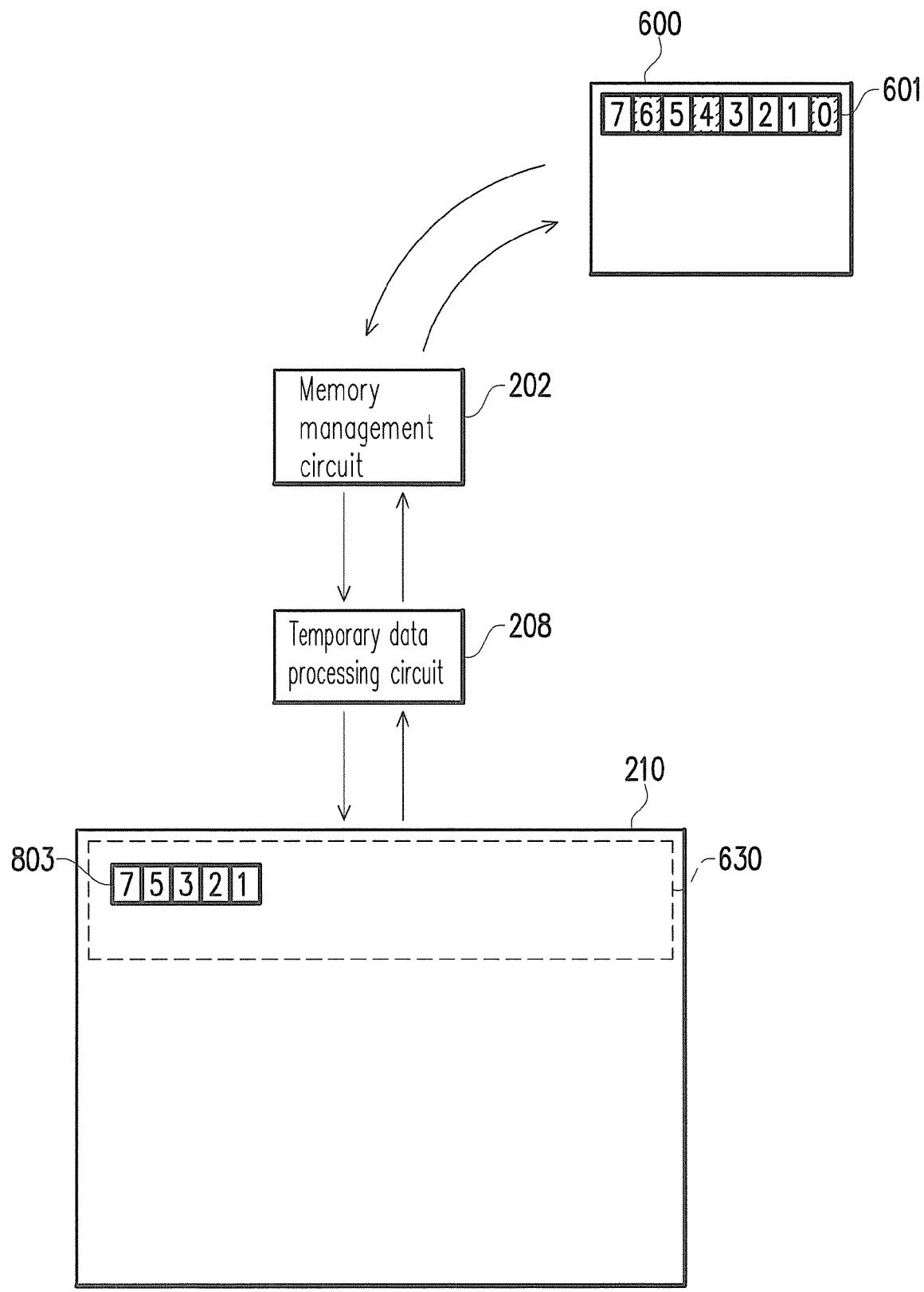
FIG. 8 is a diagram of processing a data stream of a memory management table according to an exemplary embodiment of the present invention.

FIG. 8 is a diagram of processing a data stream of a memory management table according to an exemplary embodiment of the present invention. Herein it is assumed that only the entry 601 of the first memory management table 600 is accessed in the buffer memory 210. However, this processing method is also applicable when other entries belonging to the first memory management table 600 or entries belonging to other memory management tables are accessed in the buffer memory 210.

Referring to FIG. 8, when the entry 601 of the first memory management table 600 is to be stored into the buffer memory 210, the memory management circuit 202 writes the entry 601 into the buffer memory 210 through the temporary data processing circuit 208.

To be specific, the temporary data processing circuit 208 removes data on the $0^{th}$, $4^{th}$ and $6^{th}$ bits (i.e., the invalid bit data) from the entry 601 according to the invalid bit information corresponding to the first memory management table 600, so as to generate a valid data stream 803 corresponding to the entry 601 of the first memory management table 600 and stores the valid data stream 803 into the first area 630 of the buffer memory 210.

In addition, when the entry 601 of the first memory management table 600 is to be read from the buffer memory 210, the memory management circuit 202 reads the entry 601 from the buffer memory 210 through the temporary data processing circuit 208.

To be specific, the temporary data processing circuit 208 reads the valid data stream 803 and adds the corresponding invalid bit data into the valid data stream 803 according to the invalid bit information corresponding to the first memory management table 600 so as to restore the entry 601 of the first memory management table 600. Thereafter, the temporary data processing circuit 208 sends the restored entry to the memory management circuit 202.

As described above, the storage space for storing memory management tables in the buffer memory 210 can be effectively reduced by removing invalid bit data from data streams by using the temporary data processing circuit 208. For example, in the present exemplary embodiment, each entry of the first memory management table 600 has 8 bits and 3 of which are invalid bits. Thus, 37.5% less storage space of the buffer memory 210 is used for storing the first memory management table 600.

Figure 9:
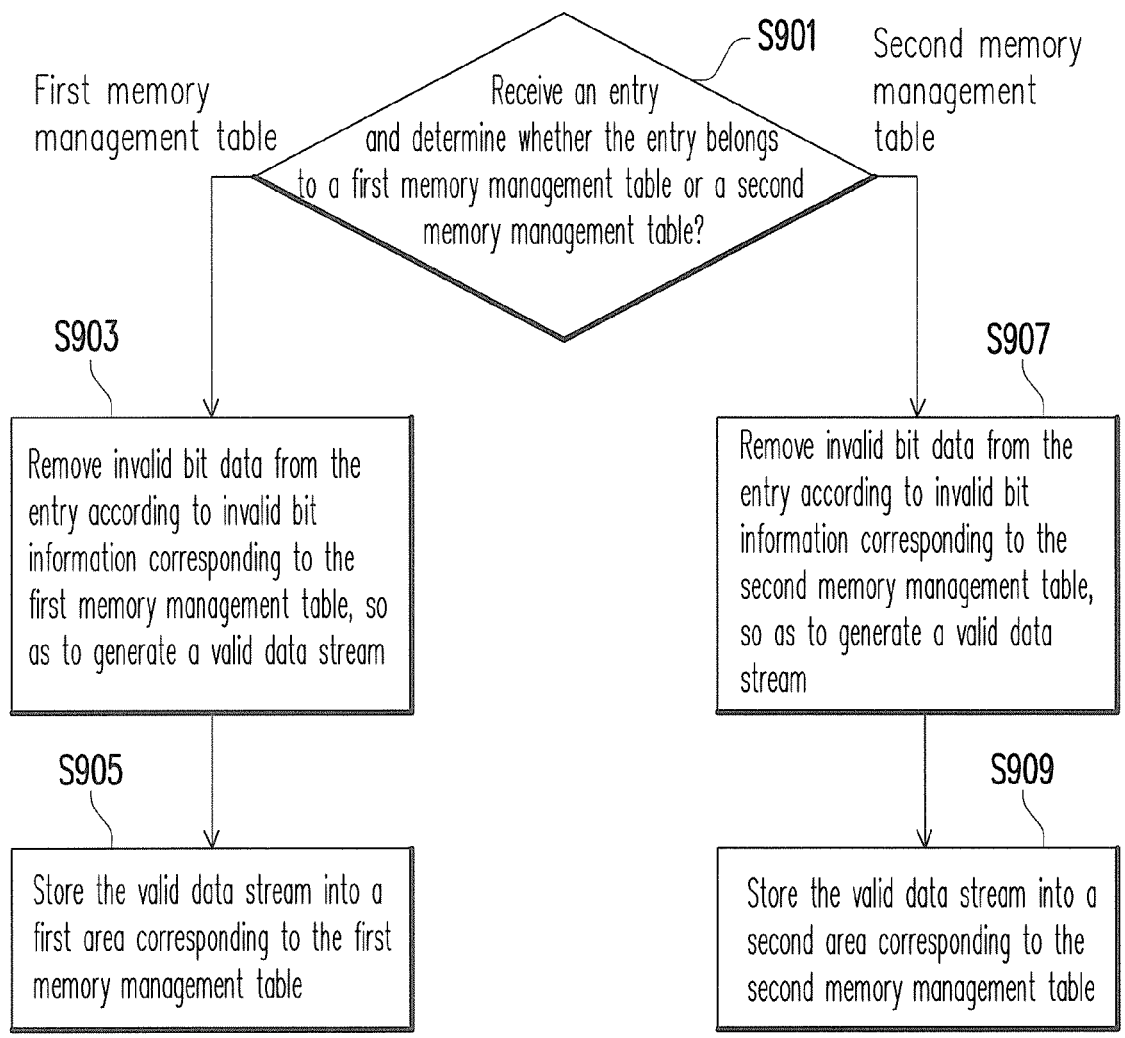
FIG. 9 is a flowchart of writing data streams corresponding to entries belonging to a memory management table into a buffer memory according to an exemplary embodiment of the present invention.

FIG. 9 is a flowchart of writing a data stream corresponding to an entry belonging to a memory management table into a buffer memory according to an exemplary embodiment of the invention.

Referring to FIG. 9, first, in step S901, an entry is received from the memory management circuit 202, and whether the received entry belongs to the first memory management table 600 or the second memory management table 610 is determined.

If the entry received from the memory management circuit 202 belongs to the first memory management table 600, in step S903, the temporary data processing circuit 208 removes invalid bit data from the entry according to the invalid bit information corresponding to the first memory management table 600, so as to generate a valid data stream. Besides, in step S905, the temporary data processing circuit 208 stores the valid data stream into the first area 630 corresponding to the first memory management table 600.

If the entry received from the memory management circuit 202 belongs to the second memory management table 610, in step S907, the temporary data processing circuit 208 removes invalid bit data from the entry according to the invalid bit information corresponding to the second memory management table 610, so as to generate a valid data stream. Besides in step S909, the temporary data processing circuit 208 stores the valid data stream into the second area 640 corresponding to the second memory management table 610.

Figure 10:
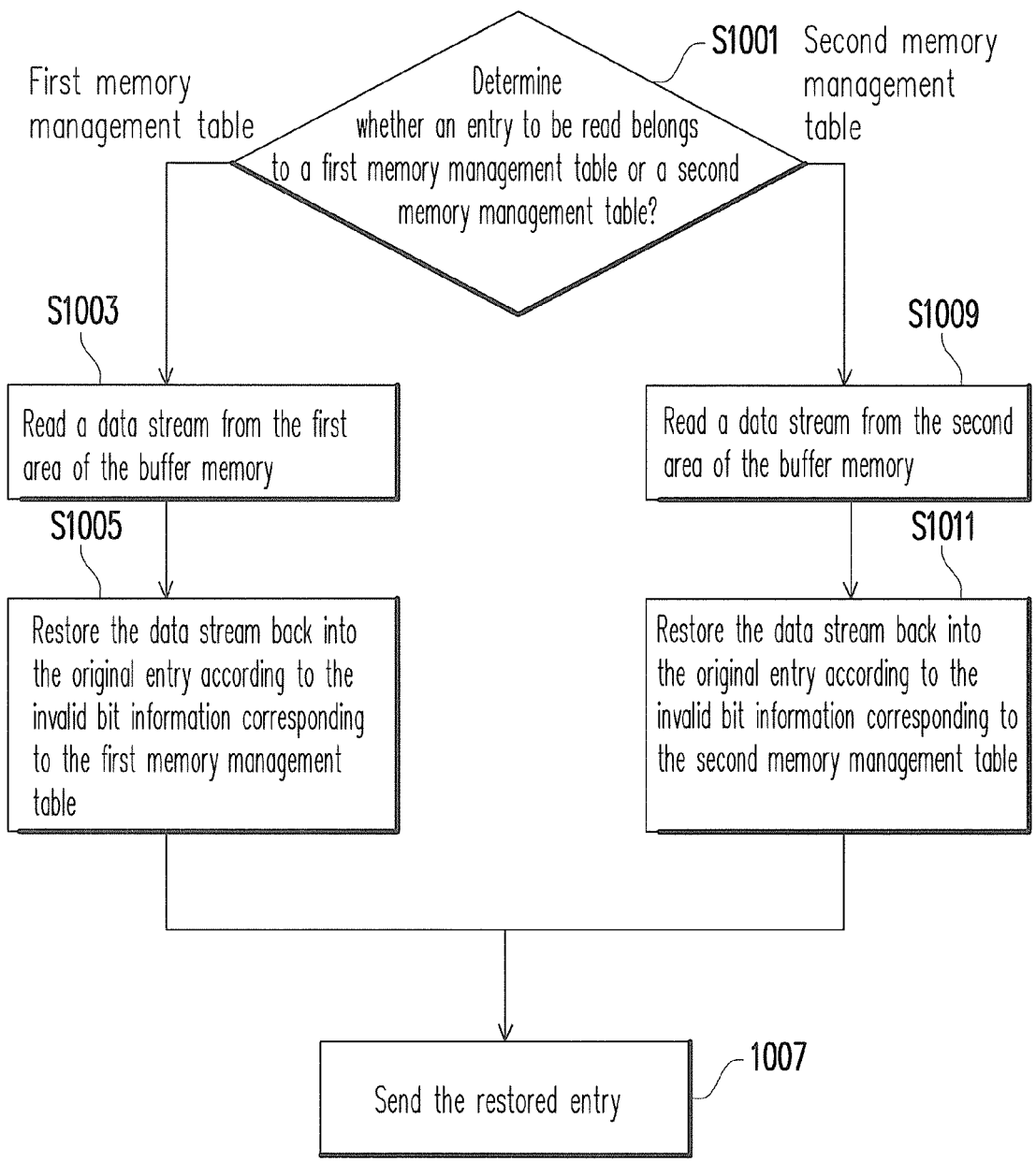
FIG. 10 is a flowchart of reading data streams corresponding to entries belonging to a memory management table from a buffer memory according to an exemplary embodiment of the present invention.

FIG. 10 is a flowchart of reading a data stream corresponding to an entry belonging to a memory management table from a buffer memory according to an exemplary embodiment of the invention.

Referring to FIG. 10, first, in step S1001, the temporary data processing circuit 208 determines whether the data stream to be read by the memory management circuit 202 belongs to the first memory management table 600 or the second memory management table 610.

If the entry to be read by the memory management circuit 202 belongs to the first memory management table 600, in step S1003, the temporary data processing circuit 208 reads the data stream from the first area 630 of the buffer memory 210. Besides, in step S1005, the temporary data processing circuit 208 restores the data stream back into an original entry according to the invalid bit information corresponding to the first memory management table 600. After that, in step S1007, the temporary data processing circuit 208 sends the restored entry to the memory management circuit 202.

If the entry to be read by the memory management circuit 202 belongs to the second memory management table 610, in step S1009, the temporary data processing circuit 208 reads the data stream from the second area 640 of the buffer memory 210. Besides, in step S1011, the temporary data processing circuit 208 restores the data stream back into an original entry according to the invalid bit information corresponding to the second memory management table 610. After that, step S1007 is executed.

It should be mentioned that in the present exemplary embodiment, the memory management tables are stored in the buffer memory. However, the invention is not limited thereto, and in another exemplary embodiment of the invention, the memory management tables may also be stored in another memory (for example, a flash memory) in the same way.

In summary, exemplary embodiments of the invention provide a memory management table processing method, a memory controller, and a memory storage apparatus, in which while writing an entry belonging to a memory management table into a buffer memory, the memory management table corresponding to the entry is first determined, invalid bit data is then removed from the entry accordingly, and eventually, the entry is written into a specific area of the buffer memory. Thereby, the memory management table processing method, the memory controller, and the memory storage apparatus provided by exemplary embodiments of the invention can effectively reduce the storage space to be used in the buffer memory. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A memory management table processing method, for storing a plurality of entries belonging to a plurality of memory management tables into a buffer memory of a memory storage apparatus, wherein each of the entries of the memory management tables has at least one invalid bit, the memory management table processing method comprising:
   configuring a plurality of areas in the buffer memory for storing the memory management tables, wherein each of the areas is corresponding to one of the memory management tables;
   recording an invalid bit information corresponding to each of the memory management tables, wherein the invalid bit information comprises a location of the invalid bit of each of the entries of the memory management tables;
   removing at least one invalid bit data from each of the entries according to the invalid bit information to generate a plurality of valid data streams corresponding to the entries of the memory management tables; and
   writing each of the valid data streams into a corresponding one of the areas in the buffer memory.

2. The memory management table processing method according to claim 1, wherein the memory management tables comprise a first memory management table and a second memory management table,
   wherein the step of configuring the plurality of areas in the buffer memory for storing the memory management tables comprises configuring a first area corresponding to the first memory management table and a second area corresponding to the second memory management table in the buffer memory.

3. The memory management table processing method according to claim 2, wherein the step of recording the invalid bit information corresponding to each of the memory management tables comprises:
   recording a first invalid bit information corresponding to the first memory management table, wherein the first invalid bit information comprises information of at least one first invalid bit of each of the entries of the first memory management table; and
   recording a second invalid bit information corresponding to the second memory management table, wherein the second invalid bit information comprises information of at least one second invalid bit of each of the entries of the second memory management table.

4. The memory management table processing method according to claim 3, wherein the step of removing the at least one invalid bit data from each of the entries according to the invalid bit information to generate the valid data streams corresponding to the entries of the memory management tables comprises:
   removing the at least one invalid bit data from each of the entries belonging to the first memory management table according to the first invalid bit information corresponding to the first memory management table to generate the valid data streams corresponding to the entries of the first memory management table; and
   removing the at least one invalid bit data from each of the entries belonging to the second memory management table according to the second invalid bit information corresponding to the second memory management table to generate the valid data streams corresponding to the entries of the second memory management table.

5. The memory management table processing method according to claim 4, wherein the step of writing each of the valid data streams into the corresponding one of the areas in the buffer memory comprises:

writing the valid data streams corresponding to the entries of the first memory management table into the first area; and writing the valid data streams corresponding to the entries of the second memory management table into the second area.

6. The memory management table processing method according to claim 1 further comprising:

reading the valid data streams corresponding to the entries of the memory management tables from the areas in the buffer memory; and restoring the valid data streams read from the areas in the buffer memory into the entries belonging to the memory management tables according to the invalid bit information of the memory management tables.

7. A memory controller, for managing a rewritable non-volatile memory module, the memory controller comprising:

a host interface, configured to couple to a host system;

a memory interface, configured to couple to the rewritable non-volatile memory module;

a memory management circuit, coupled to the host interface and the memory interface;

a buffer memory, coupled to the memory management circuit and configured to temporarily store data;

a temporary data processing circuit, coupled to the buffer memory and the memory management circuit, and configured to receive a plurality of entries belonging to a plurality of memory management tables from the memory management circuit, wherein each of the entries of the memory management tables has at least one invalid bit, wherein the temporary data processing circuit configures a plurality of areas in the buffer memory for storing the memory management tables, wherein each of the areas is corresponding to one of the memory management tables, wherein the temporary data processing circuit records an invalid bit information corresponding to each of the memory management tables, wherein the invalid bit information comprises a location of the invalid bit of each of the entries of the memory management tables, wherein the temporary data processing circuit removes at least one invalid bit data from each of the entries according to the invalid bit information to generate a plurality of valid data streams corresponding to the entries of the memory management tables, and the temporary data processing circuit writes each of the valid data streams into a corresponding one of the areas in the buffer memory.

8. The memory controller according to claim 7, wherein the memory management tables comprise a first memory management table and a second memory management table, wherein the temporary data processing circuit configures a first area corresponding to the first memory management table and a second area corresponding to the second memory management table in the buffer memory.

9. The memory controller according to claim 8, wherein the temporary data processing circuit records a first invalid bit information corresponding to the first memory management table and a second invalid bit information corresponding to the second memory management table, wherein the first invalid bit information comprises information of at least one first invalid bit of each of the entries of the first memory management table, and the second invalid bit information comprises information of at least one second invalid bit of each of the entries of the second memory management table.

10. The memory controller according to claim 9 wherein the temporary data processing circuit removes the at least one invalid bit data from each of the entries belonging to the first memory management table according to the first invalid bit information corresponding to the first memory management table to generate the valid data streams corresponding to the entries of the first memory management table, wherein the temporary data processing circuit removes the at least one invalid bit data from each of the entries belonging to the second memory management table according to the second invalid bit information corresponding to the second memory management table to generate the valid data streams corresponding to the entries of the second memory management table.

11. The memory controller according to claim 10, wherein the temporary data processing circuit writes the valid data streams corresponding to the entries of the first memory management table into the first area and writes the valid data streams corresponding to the entries of the second memory management table into the second area.

12. The memory controller according to claim 7, wherein the temporary data processing circuit further reads the valid data streams corresponding to the entries of the memory management table from the areas in the buffer memory and restores the valid data streams read from the areas in the buffer memory into the entries belonging to the memory management tables according to the invalid bit information of the memory management tables.

13. A memory storage apparatus, comprising:

a connector, configured to couple to a host system;

a rewritable non-volatile memory module, configured to store data; and a memory controller, coupled to the connector and the rewritable non-volatile memory module, the memory controller comprising:

a host interface, coupled to the connector;

a memory interface, coupled to the rewritable non-volatile memory module;

a memory management circuit, coupled to the host interface and the memory interface;

a buffer memory, configured to temporarily store data; and a temporary data processing circuit, coupled to the buffer memory and the memory management circuit, wherein the temporary data processing circuit receives a plurality of entries belonging to a plurality of memory management tables from the memory management circuit, wherein each of the entries of the memory management tables has at least one invalid bit, wherein the temporary data processing circuit configures a plurality of areas in the buffer memory for storing the memory management tables, wherein each of the areas is corresponding to one of the memory management tables, wherein the temporary data processing circuit records an invalid bit information corresponding to each of the memory management tables, wherein the invalid bit information comprises a location of the invalid bit of each of the entries of the memory management tables, wherein the temporary data processing circuit removes at least one invalid bit data from each of the entries according to the invalid bit information to generate a plurality of valid data streams corresponding to the entries of the memory management tables, and the temporary data processing circuit writes each of the valid data streams into a corresponding one of the areas in the buffer memory.

14. The memory storage apparatus according to claim 13, wherein the memory management tables comprise a first memory management table and a second memory management table,
> wherein the temporary data processing circuit configures a first area corresponding to the first memory management table and a second area corresponding to the second memory management table in the buffer memory.

15. The memory storage apparatus according to claim 14, wherein the temporary data processing circuit records a first invalid bit information corresponding to the first memory management table and a second invalid bit information corresponding to the second memory management table, wherein the first invalid bit information comprises information of at least one first invalid bit of each of the entries of the first memory management table, and the second invalid bit information comprises information of at least one second invalid bit of each of the entries of the second memory management table.

16. The memory storage apparatus according to claim 15,
> wherein the temporary data processing circuit removes the at least one invalid bit data from each of the entries belonging to the first memory management table according to the first invalid bit information corresponding to the first memory management table to generate the valid data streams corresponding to the entries of the first memory management table,
> wherein the temporary data processing circuit removes the at least one invalid bit data from each of the entries belonging to the second memory management table according to the second invalid bit information corresponding to the second memory management table to generate the valid data streams corresponding to the entries of the second memory management table.

17. The memory storage apparatus according to claim 16, wherein the temporary data processing circuit writes the valid data streams corresponding to the entries of the first memory management table into the first area and writes the valid data streams corresponding to the entries of the first memory management table into the second area.

18. The memory storage apparatus according to claim 13, wherein the temporary data processing circuit further reads the valid data streams corresponding to the entries of the memory management tables from the areas in the buffer memory,
> wherein the temporary data processing circuit restores the valid data streams read from the areas in the buffer memory into the entries belonging to the memory management tables according to the invalid bit information of the memory management tables.

19. A memory management table processing method, for a memory management table, wherein the memory management table has a plurality of entries, and each of the entries has at least one invalid bit, the memory management table processing method comprising:
> configuring a predetermined area in a memory for storing the memory management table;
> recording an invalid bit information of the memory management table, wherein the invalid bit information comprises a location of the invalid bit of each of the entries of the memory management table;
> receiving at least one of the entries of the memory management table;
> removing at least one invalid bit data from at least one of the entries according to the invalid bit information to generate a valid data stream corresponding to at least one of the entries of the memory management table; and
> writing the valid data stream into the predetermined area.

* * * * *